(12) United States Patent
Chapman

(10) Patent No.: US 7,984,692 B2
(45) Date of Patent: Jul. 26, 2011

(54) ROTARY PARLOUR FOR MILKING OF ANIMALS

(75) Inventor: John Chapman, New Plymouth (NZ)

(73) Assignee: DeLaval Holding AB, Tumba (SE)

( * ) Notice: Subject to any disclaimer, the term of this patent is extended or adjusted under 35 U.S.C. 154(b) by 253 days.

(21) Appl. No.: 12/295,824

(22) PCT Filed: Mar. 29, 2007

(86) PCT No.: PCT/SE2007/050197
§ 371 (c)(1),
(2), (4) Date: Dec. 9, 2008

(87) PCT Pub. No.: WO2007/114778
PCT Pub. Date: Oct. 11, 2007

(65) Prior Publication Data
US 2009/0183686 A1 Jul. 23, 2009

(30) Foreign Application Priority Data
Apr. 3, 2006 (SE) .................................. 0600746

(51) Int. Cl.
A01K 1/12 (2006.01)

(52) U.S. Cl. ................................................ 119/14.04

(58) Field of Classification Search ............... 119/14.03, 119/14.04, 516, 520, 525
See application file for complete search history.

(56) References Cited

U.S. PATENT DOCUMENTS

| 3,095,854 | A | * | 7/1963 | Bott et al. | 119/14.04 |
| 3,103,912 | A | | 9/1963 | Bendetto | |
| 3,752,122 | A | | 8/1973 | Ciribelli | |
| 3,759,225 | A | * | 9/1973 | Galbraith | 119/14.04 |
| 3,934,551 | A | * | 1/1976 | Sulzberger | 119/14.04 |
| 5,687,673 | A | | 11/1997 | Bowers | |
| 5,782,738 | A | | 7/1998 | Bowers | |
| 5,865,145 | A | * | 2/1999 | Kofman | 119/527 |
| 6,189,288 | B1 | | 2/2001 | Bowers | |
| 6,394,029 | B1 | | 5/2002 | Bowers | |
| 2005/0120966 | A1 | | 6/2005 | Johannesson et al. | |

FOREIGN PATENT DOCUMENTS

| AU | 19971/76 | 6/1978 |
| AU | 671483 | 4/1994 |
| DE | 4101530 A1 | 7/1992 |

* cited by examiner

Primary Examiner — Rob Swiatek
Assistant Examiner — Kristen C Hayes
(74) Attorney, Agent, or Firm — Hovey Williams LLP

(57) ABSTRACT

The invention relates to a rotary parlour for milking of animals. The rotary parlour includes an annular platform (3) having a surface to support animals (1) to be milked, a circular rail member (14) arranged on an underside of the platform (3) connected to the platform (3) in at least one position (3e), a plurality of rolling members (15) adapted to be in contact with the rail member (14) such that the platform (3) is rotatably arranged on the rolling members (15) and at least one stiff object (7, 13) arranged on the upper side of the platform (3) and connected to the platform (3) in a at least one position (3c, 3d). Further more, the rotary parlour includes a rigid connection between the object (7, 13) and the rail member (14) which includes a bar arrangement (19).

19 Claims, 2 Drawing Sheets

ROTARY PARLOUR FOR MILKING OF ANIMALS

THE BACKGROUND OF THE INVENTION AND PRIOR ART

The present invention relates to a rotary parlour for milking of animals, wherein the rotary parlour comprises an annular platform having a surface to support animals to be milked, a circular rail member arranged on an underside of the platform connected to the platform in at least one position, a plurality of rolling members adapted to be in contact with the rail member such that the platform is rotatably arranged on the rolling members and at least one stiff object arranged on the upper side of the platform and connected to the platform in a at least one position.

The size of a rotary parlour must be adapted to individual farmer's available space and number of cows. A platform of a rotary parlour adapted to receive about 20 to 40 cows is too large to be transported. Therefore, the assembly of rotary parlours in situ is required. Milking cows have a weight of about 600-900 kg. The platform of a rotary parlour has to have a strength such the platform will not be deflected by the weight of the cows during the rotary motion of the platform. If parts of the platform is deflected, the contact surface of the rail member may be turned or displaced locally, which can result in an unstable motion of the platform on the rolling members.

Conventional platforms of rotary parlours includes large quantities of strength materials as, for example, steel or concrete and a framework on the underside such that the platform achieves the necessary stiffness. The framework may comprise standardised beams welded or screwed together. Consequently, conventional platforms are heavy and hard to handle and the assembly work of a conventional rotary parlour is complicated.

SUMMARY OF THE INVENTION

The object of the present invention is to achieve a rotary parlour for milking of animals of the initial kind having a platform, which is considerably lighter than conventional platforms and easier to assemble.

This object is achieved by the rotary parlour initially defined, which is characterised in that the rotary parlour comprises a rigid connection between the object and the rail member which comprises a bar arrangement. Such a rigid bar arrangement counteracts relative motions between the rail member and the object. Since the object and the rail member is rigid elements, the bar arrangement also counteracts relative motions between the fastening positions of the rail member and the object in the platform. If a cow stands, for example, with the front legs in an area in the vicinity of the fastening position of the object, the weight is transferred from the platform, via the stiff object and the stiff bar arrangement, to the rail member. Consequently, the platform needs only to take up a smaller part of the weight from the front legs of the cow. Thereby, the platform can be manufactured of a relative thin material. Furthermore, the platform can be provided with a considerably smaller underlying framework. Alternatively, the underlying framework can be excluded. Further, the rigid connection between the object and the rail member stabilises the position of the rail member in relation to the rolling members. This results in a good stability of the platform on the rolling members during rotation. Consequently, a rotary parlour comprising such rigid bar arrangement can be provided with a light platform which is easy to assemble.

According to an embodiment of the invention, the bar arrangement comprises a first bar element having an extension through the platform. Thereby, it is possible to minimise the length of the bar arrangement. Furthermore, such an extension of the first bar element makes it easy to accomplish a connection between the bar arrangement and the platform. The first bar element may be a straight rod element having a relatively high stiffness. The first bar element may constitute a rigid connection between the platform and the rail member. The first bar element may be connected to the rail member at an lower end, for example, by welding. In this way, a fix connection is achieved between the first bar element and the rail member.

According to a further embodiment of the invention, the bar arrangement comprise a second bar element arranged on the upper side of the platform, which constitutes a rigid connection between the first bar element and the object. Such a second bar element can also constitute a substantially straight rod element having a high stiffness. The second part can be connected to the first bar element and the object by welding. The bar arrangement may also comprise a third bar element arranged on the upper side of the platform, which constitutes a rigid connection between the first bar element and a second rigid object arranged on the upper side of the platform. Such a second bar element can also constitute a substantially straight rod element having a high stiffness. The second bar element can be connected to the first bar element and the second object by welding. In this case, a substantially Y-shaped bar arrangement is obtained, which can supply a increased stiffness to a relatively large part of the platform.

According to a further embodiment of the invention, the bar arrangement constitutes a rigid connection between a rail member and an object having a fastening position in the platform located radially inwardly of the position of the rail member. In this case, the bar arrangement supplies stiffness to at least an area of the platform located radially inwardly of the rail member. Alternatively or in combination, the bar arrangement constitutes a rigid connection between a rail member and an object having a fastening position in the platform located radially outwardly of the position of the rail member. In such a case, the bar arrangement supplies stiffness to at least an area of the platform located radially outwardly of the rail member.

According to a further embodiment of the invention, the bar arrangement is connected to an object constituting a part of a fence arrangement arranged on the platform. Normally, platforms of rotary parlours already comprise a plurality of fence arrangement attached to the platform. If the bar arrangement is connected to a stiff part of such an already existing fence arrangement, no further stiff objects have to be mounted on the platform. The bar arrangement may be connected to an object constituting a supporting element of the fence arrangement. Such a supporting element is a stiff element which is connected to the platform. The bar arrangement may be connected to an object in the form of a vertical post element. Vertical post elements are many times used as supporting elements in fence arrangements on rotary platforms. The bar arrangement may be connected to an object in the form of a cabinet. In some cases, cabinets are used as supporting elements of fence arrangements on rotary platforms. Such a cabinet has the necessary stiffness to transfer loads from the platform to the bar arrangement.

According to a further embodiment of the invention, the bar arrangement is connected to an object in the form of a reinforcement element which is connected to several supporting elements connected to the platform in different positions. The supporting elements and the reinforcement element constitute a rigid unit which can transfer load from a relatively large part of the platform to one or several bar arrangement according to the invention. The reinforcement element may be connected to supporting elements of fence arrangements, which are adapted to divide the platform into stalls for receiving individual animals. The most rotary parlours are provided with such fence arrangements arranged on the platform with constant intervals. Such already existing fence arrangements are very suitable to use in this case. Preferably, the reinforcing element has a circular extension. Thereby, it can be connected to supporting elements arranged around the whole platform. Advantageously, the circular reinforcing element is connected to supporting elements having different positions in the vicinity of an inner circumference edge of the annular platform. The circular reinforcing element is here mounted internally of the milking stalls. In this position, the circular reinforcing element does not encroach on the space for cows and equipment used on the platform.

According to a further embodiment of the invention the platform is made of concrete. Concrete is a stiff material which is suitable to use in platforms for rotary parlours. It is relatively easy to connect elements of different kinds to a concrete platform by means of bolts or the like. Alternatively, the platform is made of steel. Steel is a stiff material which is suitable to use in platforms for rotary parlours. It is also relatively easy to connect different elements to a steel platform by means of welding or bolt. Certainly, it is possible to manufacture the platform in other materials such as suitable plastic materials and combinations of materials. The annular platform may have has an inner circumference edge located at a higher level than an outer circumference edge. Preferably, the annular platform has a plane surface sloping about 30 in relation to a horizontal plane. This simplifies the cleaning of the platform because water and dirt rinse off easily. Such a sloping of the platform is preferred if the milking members are attached by operators working from the outside of the platform. Alternatively, the annular platform has an inner circumference edge located at a lower level than an outer circumference edge. Such a sloping of the platform is preferred if the milking members are attached by operators working from the inside of the platform.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED
EMBODIMENTS OF THE INVENTION

Figure 1:
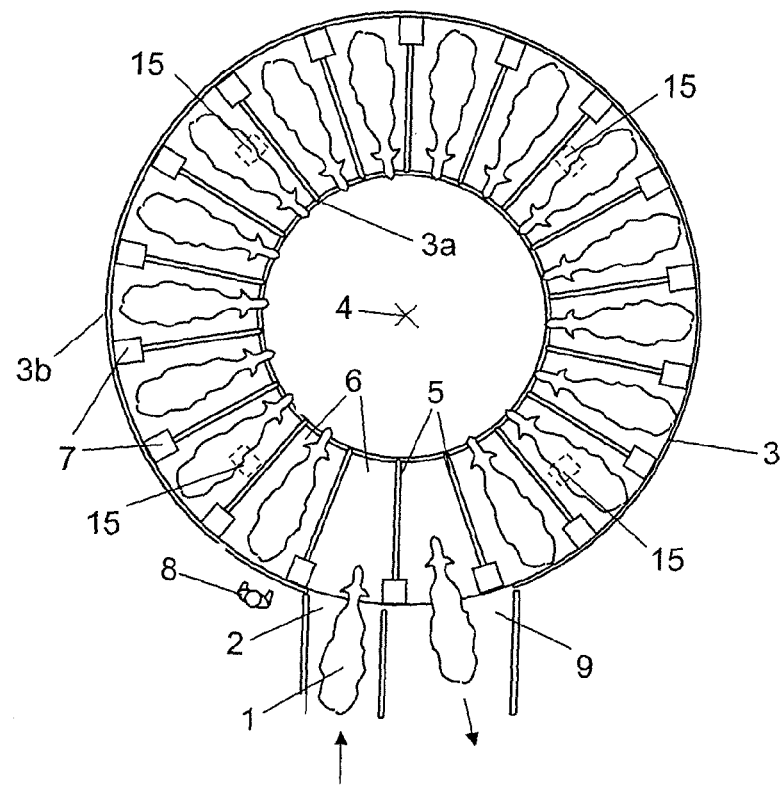
FIG. 1 shows a rotary parlour for milking of cows.

FIG. 1 shows a rotary parlour for milking of cows 1. The cows 1 to be milked are arranged to walk through an entry 2 to enter an annular platform 3. The platform 3 is rotatably arranged around a substantially vertical axis 4. A plurality of fence arrangements 5 are mounted on the platform, which divide the platform 3 into stalls 6 for receiving individual cows 1. In this case, the fence arrangements 5 have a substantially radial extension on the platform 3 in relation to the vertical axis 4. The fence arrangement 5 comprises a stiff cabinet 7 arranged at an outer radial position of the platform 3, which constitute a supporting element of the fence arrangement 5. The cabinet 7 has an inner space, which may accommodate milking equipment and other components in the stall 6. In this case, the stalls 6 are arranged such that the cows face inwards from the stalls 6 and operators 8 work from the outside of the annular platform 3. An operator 8 may, for example, attach milking members to the cows 1 when they have entered a stall 6. The cows rotate nearly 360° on the platform 3 during a milking operation. The cows 1 leave the stall 6 and the platform 3 through an exit 9 after having been milked and possibly fed during the milking operation.

Figure 2:
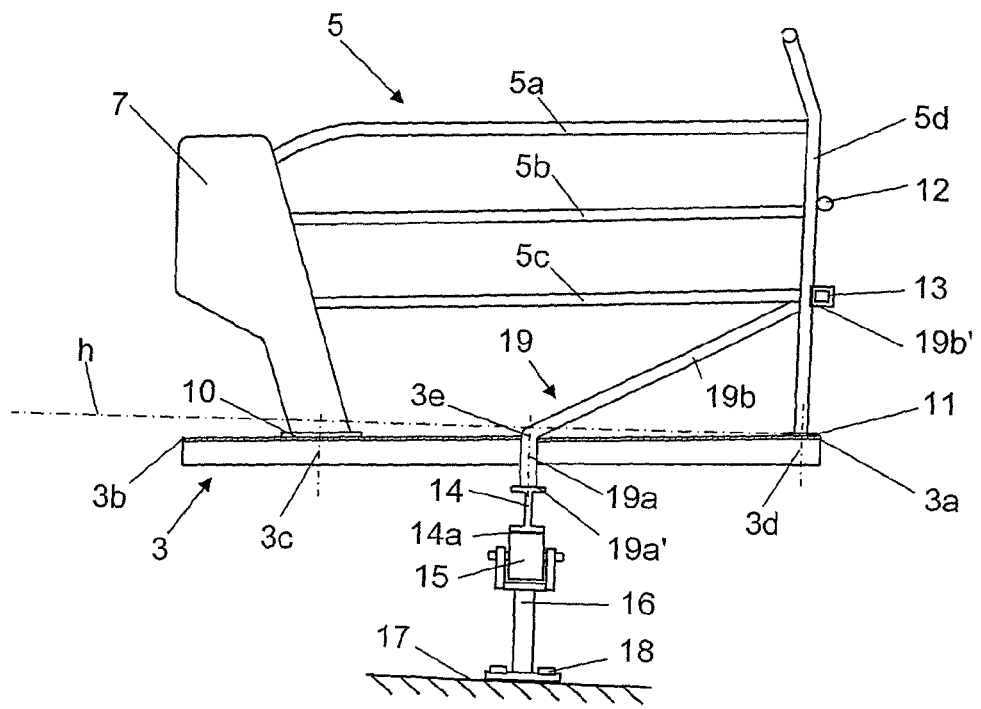
FIG. 2 shows a sectional view of a part of a platform of a rotary parlour provided with a bar arrangement according to a first embodiment of the invention and, FIG. 3 shows a sectional view of a part of a platform of a rotary parlour provided with a bar arrangement according to a second embodiment of the invention.

FIG. 2 shows a sectional view through a part of the annular platform 3. In this embodiment, the platform 3 is made of steel. The platform 3 has a substantially plane upper surface for supporting cows to be milked. An inner circumferential edge 3a of the annular platform 3 is located at a somewhat higher level than an outer circumference edge 3b of the platform 3. Consequently, the upper surface of the platform 3 has a smooth slope in relation to a horizontal plane h. Thereby, it is easy to clean the platform 3 since water and dirt rinse off easily. One fence arrangement 5 is shown in FIG. 2. The fence arrangement 5 comprises a number of fence elements 5a-c having a substantially horizontal extension in parallel above each other at different levels. Each of the fence elements 5a-c have an outer end connected to the cabinet 7 and an inner end connected to stiff substantially vertical post 5d. The cabinet 7 is connected to the upper surface of platform 3 by means of a suitable connection 10 in a fastening position 3c. The fastening position 3c may be in the vicinity of the outer circumference 3b of the platform 3. The cabinet 7 may be attached to the platform 3 by means of bolts or welding. The vertical post 5d is connected to the platform 3 by means of a suitable connection 11 in a fastening position 3d. The fastening position 3d may be in the vicinity of the inner circumference 3a of the platform 3. The vertical post 5d can also be connected to the platform 3 by means of bolts or welding.

A breast rail 12, is connected to the vertical posts 5d of the respective fence arrangements 5. The breast rail 12 has a circular extension in an position substantially above the inner circumference edge 5a of the platform 5. The breast rail 12 is arranged to position the cows 1 in the stalls 6 and to prevent the cows 1 from accidentally falling or stepping into the centre of the parlour. Furthermore, a circular reinforcing element 13 is connected to the vertical posts 5d in a position below the breast rail 12 but in a position above the inner circumference edge 3a of the platform 3. Preferably, the circular reinforcing element 13 provides a stiff connection between the vertical posts 5d of all fence arrangements 5 mounted on the platform 3. A stiff rail member 14 is mounted on an underside of the platform 3. The rail member 14 has a circular extension on the underside of the platform 3. The rail member 14 has a lower surface 14a arranged to be in contact with a plurality of rollers 15 arranged on stands 16 in different positions under the circular rail member 14. One stand 16 with one roller 15 is shown in FIG. 2. The stand 16 is arranged on a floor 17 located under the platform 3 by means of a bolts connection 18. At least one of the rollers is driven by a motor. Thereby, it is possible to perform a rotary motion of the platform 3 with a desired rotary speed and a minimum of friction.

The rotary parlour comprises a bar arrangement 19 in the form of a first substantially straight bar element 19a and a second substantially straight bar element 19b. The first bar element 19a has an extension through the platform 3. The first bar element 19a may be connected to the platform 3, for example, by welding. The rail member 14 is connected to a lower end portion 19a' of the first bar element 19a, for example, by welding. The second bar element 19b is arranged on the upper side of the platform 3. The second bar element 19b is at a lower end portions connected to an upper end portion of the first bar element 19a. An upper end portion 19b' of the second bar element 19b is connected to the circular reinforcing element 13.

Alternatively, the upper end portion 19b' of the second bar element 19b can be connected to the post 5d or the lowest fence element 5c in the vicinity of the circular reinforcing element 13.

Consequently, the circular reinforcing element 13 is connected to the post elements 5d of the respective fence arrangements 5 having a position 3d in the vicinity of the inner circumference edge 3d of the platform 3. Thereby, the circular reinforcing element 13 and the stiff post elements 5d constitutes a stiff arrangement which supplies stiffness to the platform 3 in an area in the vicinity of the inner circumference edge 3a of the platform. The existent of this stiff arrangement guarantees that this area of the platform is firmly positioned at the same level around the whole platform 3. The above mentioned bar arrangement 19, which is connected to the respective fence arrangements 5, constitutes a rigid connection between the circular reinforcing element 13 and the rail member 14. Thereby, the rail member 14 is held in a fix position in relation to the circular reinforcing element 13. Thus, the whole circular rail member 14 is held in a desired position in relation to the roller 15 such that the platform 3 achieves a very good stability on the rollers 15 during a rotary motion. Furthermore, the second bar element 19b constitutes a rigid connection between the platform 3 and the circular reinforcing element 13 located at a level above the level of the platform 3. Thereby, the second bar element 19b in an effective manner counteracts the torque, which arises when the cows 1 stand on the platform 3 and which tends to deflect the radially outwardly located parts of the platform downwardly in relation to the relatively stiff inner edge part 3a of the platform.

Preferably all fence arrangements 5 around the platform 3 comprises a bar arrangement 19. The bar arrangement 19 counteracts relative motions between the rail member 14 and the circular reinforcing element 13. Since the circular reinforcing element 13 and the rail member 14 are rigid element, the rigid bar arrangement 19 also counteracts relative motions between the fastening positions 3d, 3e of the circular reinforcing element 13 and the rail member 14 in the platform. If, for example, the front legs of a cow 1 stands in an area of the platform 3 in the vicinity of the fastening position 3d of a post element 5d, the load from the front legs is transferred from the platform 3, via the stiff post element 5d, the circular reinforcing element 13 and the bar arrangement 19, to the rail member 14. In this area, the platform 3 may have a relatively reduced stiffness. Thereby, it is possible to reduce the material thickness in the steel platform 3 and eliminate or reduce an underlying framework. Such a platform 3 may be relatively light and easy to assemble. Furthermore, the use of the bar arrangement 19 provides freedom of design for different slopes of the platform 3 and for the arrangement of the rail member 14 in a desired position under the platform 3.

Figure 3:
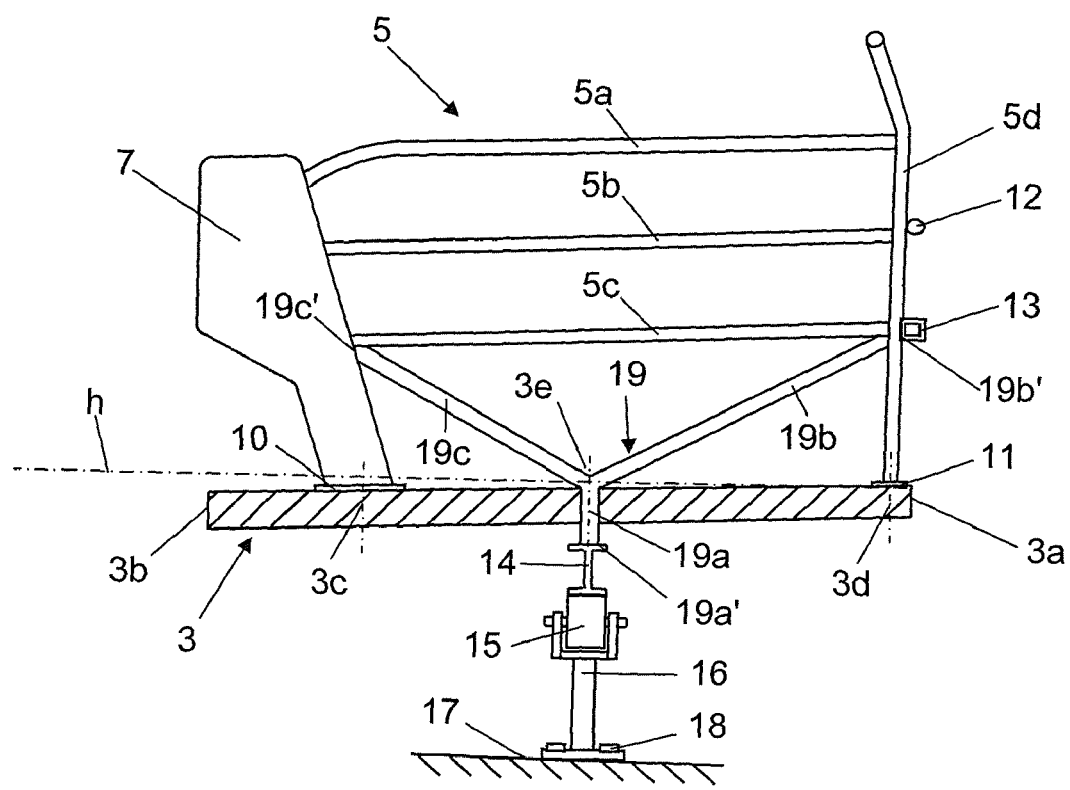

FIG. 3 shows an alternative embodiment of the bar arrangement 5. The platform 3 is here manufactured of concrete. The bar arrangement comprises a first bar element 19a, which is embedded in the concrete such that it is connected to the platform 3. The bar arrangement 19 comprises a second bar element 19b and a third bar element 19c which are arranged on the upper side of the platform 3. The second bar element 19b and the third bar element 19c are at its lower end portions connected to each other and to an upper end portion of the first bar element 19a. An upper end portion 19b' of the second bar element 19b is connected to the circular reinforcing element 13. The upper end portion 19c' of the third bar element 19c is connected to the cabinet 7 at a suitable level above the level of the platform 3. Alternatively, the upper end portion 19c' of the third bar element 19c may be connected to the lower fence element 5c in the vicinity of the cabinet 7.

The function of the first bar element 19a and the second bar element 19b of the bar arrangement is the same as in the embodiment described above with reference to FIG. 2. However, the bar arrangement here constitutes a substantially straight third bar element 19c which together with the first bar element 19a constitutes a rigid connection between the cabinet 7 and the rail member 14. The cabinet 7 is connected to the platform 3 by the connection 10 in a position 3c in the vicinity of the outer circumference edge 3b of the platform 3. The rail member 14 is connected to the platform 3 in a position 3e located between the position 3c of the cabinet 7 and the rail member 14 counteracts deflections of the platform 3 especially in the vicinity of the outer circumferential edge 3b of the platform. Vertical loads, especially in the form of the weight from the rear legs of a cow acts on the platform 3, via the stiff cabinet 7, the third bar element 19c and the first bar element 19a, to the rail member 14. By the use of such a substantially Y-shaped bar arrangement 19, it is possible to use a light platform 3 which is relatively simple to assemble.

The invention is not restricted to the described embodiments in the figures, but may be varied freely within the scope of the claims. The bar arrangement does not need to comprise a plurality of straight bar elements connected to each other. The bar arrangement may be a single bar having an arbitrary but suitable extension. The invention is suitable to use in platforms having one rail member on the underside but it can be used in platforms having two rail members.

The invention claimed is:

1. A rotary parlour for milking of animals, comprising: an annular platform having a surface to support animals to be milked; a circular rail member arranged on an underside of the platform and connected to the platform in at least one position; a plurality of rolling members adapted to be in contact with the rail member such that the platform is rotatably arranged on the rolling members and at least one stiff object arranged on the upper side of the platform and connected to the platform in at least one fastening position; and a rigid connection between the stiff object and the rail member which comprises a bar arrangement, wherein the bar arrangement comprises a first bar element having an extension through the platform.

2. A rotary parlour according to claim 1, wherein the first bar element constitutes a rigid connection between the platform and the rail member.

3. A rotary parlour according to claim 2, wherein the bar arrangement comprises a second bar element arranged on the upper side of the platform which constitutes a rigid connection between said first bar element and the object.

4. A rotary parlour according to claim 3, wherein the bar arrangement comprises a third bar element arranged on the upper side of the platform which constitutes a rigid connection between the first bar element and a second stiff object arranged on the upper side of the platform.

5. A rotary parlour according to claim 1, wherein the bar arrangement further constitutes a rigid connection between the rail member and the stiff object and wherein the fastening position of the stiff object to the platform is located radially inwardly of the at least one fastening position of the rail member.

6. A rotary parlour according to claim 1, wherein the fastening position of the stiff object to the platform is located radially outwardly of the at least one fastening position of the rail member.

7. A rotary parlour according to claim 1, wherein the bar arrangement is connected to the stiff object, the stiff object constituting a part of a fence arrangement arranged on the platform.

8. A rotary parlour according to claim 7, wherein the bar arrangement is connected to the stiff object, the stiff object constituting a supporting element of the fence arrangement.

9. A rotary parlour according to claim 8, wherein the stiff object to which the bar arrangement is connected includes a vertical post element.

10. A rotary parlour according to claim 8, wherein the stiff object to which the bar arrangement is connected includes a cabinet.

11. A rotary according to claim 8, including a plurality of supporting elements, wherein a reinforcement element is connected to the plurality of supporting elements of the fence arrangement which divides the platform into stalls for receiving individual animals.

12. A rotary parlour according to claim 11, wherein the reinforcement element has a circular extension.

13. A rotary parlour according to claim 1, including a plurality of supporting elements, wherein the bar arrangement is connected to a reinforcement element which is connected to the plurality of supporting elements which in turn are connected to the platform in different positions.

14. A rotary parlour according to claim 13, wherein the reinforcement element has a circular extension.

15. A rotary parlour according to claim 14, wherein the circular reinforcing element is connected to ones of the plurality of supporting elements arranged in different positions around the platform having fastening positions in the vicinity of an inner circumference edge of the annular platform.

16. A rotary parlour according to claim 1, wherein the platform is made of materials including concrete.

17. A rotary parlour according to claim 1, wherein the platform is made of materials including steel.

18. A rotary parlour according to claim 1, wherein the annular platform has an inner circumference edge located at a higher level than an outer circumference edge.

19. A rotary parlour according to claim 1, wherein the annular platform has an inner circumference edge located at a lower level than an outer circumference edge.

* * * * *